(12) United States Patent
Chen

(10) Patent No.: US 10,783,819 B1
(45) Date of Patent: Sep. 22, 2020

(54) DIGITAL COLOR DISPERSION CORRECTION

(71) Applicant: Facebook Technologies, LLC, Menlo Park, CA (US)

(72) Inventor: Dong Chen, Foster City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/253,587

(22) Filed: Jan. 22, 2019

(51) Int. Cl.
*G09G 3/20* (2006.01)
*G06F 1/16* (2006.01)

(52) U.S. Cl.
CPC ............ *G09G 3/2003* (2013.01); *G06F 1/163* (2013.01); *G06F 1/1637* (2013.01); *G09G 2320/0242* (2013.01); *G09G 2320/0666* (2013.01)

(58) Field of Classification Search
CPC ............ G02F 1/13336; G02B 27/0068; G02B 27/017; G02B 27/0103; G02B 30/25; G02B 6/0026; G06F 3/012; G06F 3/013
See application file for complete search history.

(56) References Cited

U.S. PATENT DOCUMENTS

| | | | |
|---|---|---|---|
| 5,742,262 A | 4/1998 | Tabata et al. | |
| 9,442,292 B1 | 9/2016 | Gao et al. | |
| 2007/0035707 A1 | 2/2007 | Margulis | |
| 2008/0297894 A1 | 12/2008 | Kim et al. | |
| 2009/0295744 A1 | 12/2009 | Onishi | |
| 2010/0091027 A1* | 4/2010 | Oyama | G02B 27/0068 345/581 |
| 2015/0116354 A1 | 4/2015 | Tomlin et al. | |
| 2015/0205132 A1 | 7/2015 | Osterhout et al. | |
| 2017/0039904 A1* | 2/2017 | Jepsen | G02F 1/13336 |
| 2017/0102544 A1* | 4/2017 | Vallius | G02B 6/0026 |
| 2017/0261751 A1* | 9/2017 | Noguchi | G02B 27/0103 |
| 2018/0067322 A1* | 3/2018 | Alexander | G02B 27/0103 |
| 2018/0101230 A1* | 4/2018 | Vidal | G01S 17/88 |
| 2018/0114298 A1 | 4/2018 | Malaika et al. | |
| 2018/0321426 A1 | 11/2018 | Weinstock et al. | |
| 2019/0049741 A1* | 2/2019 | Bai | G02B 30/25 |

OTHER PUBLICATIONS

Non-Final Office Action, U.S. Appl. No. 16/220,806, Notification Date: Jan. 24, 2020, 10 pages.
Non-Final Office Action, U.S. Appl. No. 16/171,614, Notification Date: Feb. 12, 2020, 14 Pages.

* cited by examiner

*Primary Examiner* — Jennifer Mehmood
*Assistant Examiner* — James S Nokham
(74) *Attorney, Agent, or Firm* — Freestone Intellectual Property Law PLLC; Aaron J. Visbeek

(57) ABSTRACT

An image is received that includes red, green, and blue subpixel values for each pixel in the image. A dispersion adjustment profile is applied to the image to generate a dispersion-corrected image. The dispersion adjustment profile is specific to an optical assembly disposed over a display pixel array of a head mounted display. The dispersion-corrected image is rendered to the display pixel array of the head mounted display.

19 Claims, 12 Drawing Sheets

DIGITAL COLOR DISPERSION CORRECTION

TECHNICAL FIELD

This disclosure relates generally to image correction, and in particular to color dispersion correction for head mounted displays.

BACKGROUND INFORMATION

Head mounted displays (HMDs) may include a display for presenting images to a user of the HMD. The quality of the presented images may enhance the user experience and contribute to the feeling of "presence" that a user experiences when engaged in virtual reality, for example. In many HMDs, an optical assembly is used with the display to focus images rendered to the display as virtual image for users of the HMD. The combination of the display and optical assembly for presenting virtual images may present image correction challenges including an undesirable color-shift in the virtual image because of color dispersion properties of the optical assembly.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
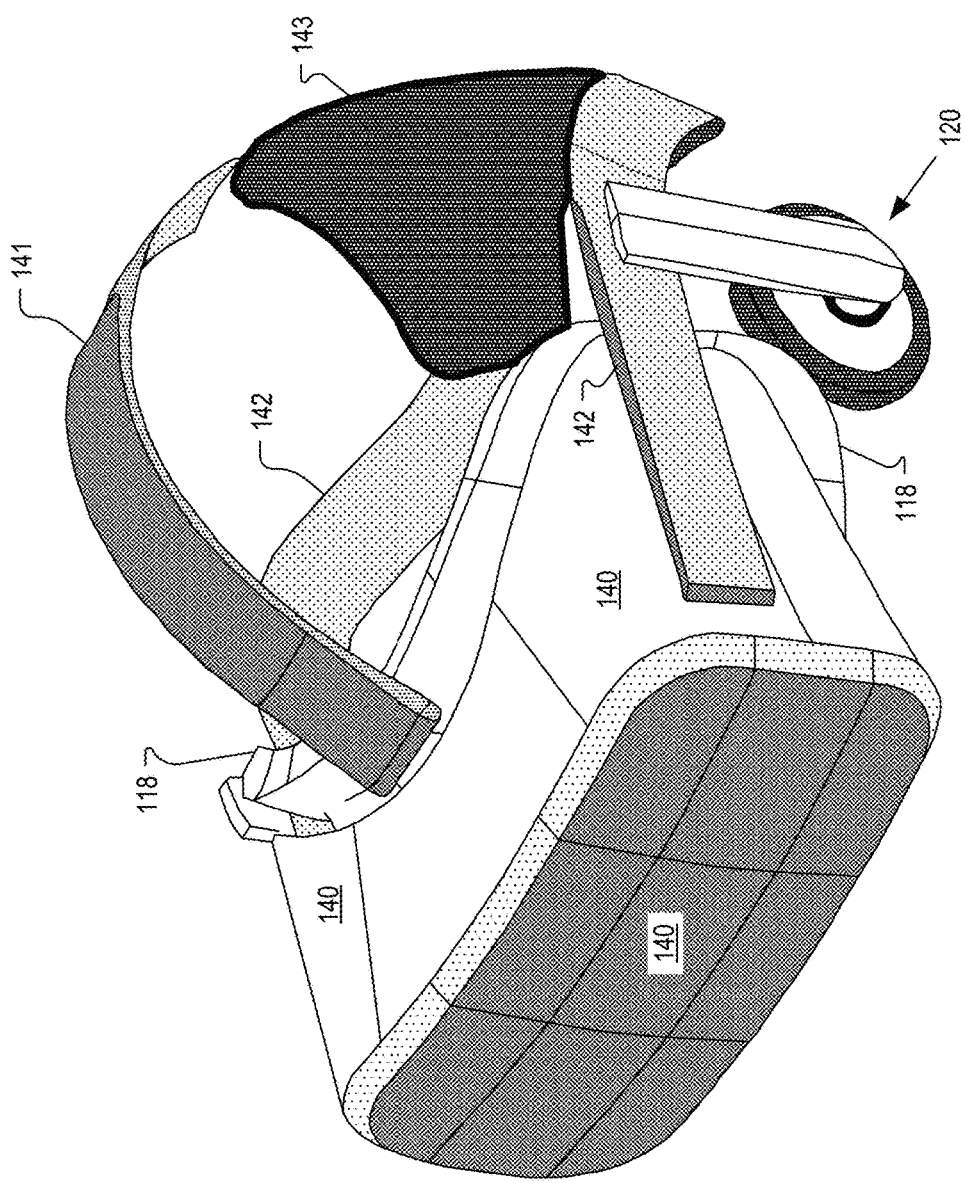
FIG. 1 illustrates an example head mounted display (HMD) that may be configured for digital color dispersion correction, in accordance with an embodiment of the disclosure.

Embodiments of a head mounted display and methods that correct color dispersion are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The Head Mounted Display (HMD) and process for color dispersion correction that are described in this disclosure may improve the fidelity of virtual images according to a specified white color target. Display light emitted by a display of an HMD often goes through one or more layers of an optical assembly. The optical assembly may bend or focus the display light for an eye of the user of the HMD. Additionally, the dispersion angle of different wavelengths of display light change the brightness of the different wavelengths. In one example, red, green, and blue display light have different dispersion angles exiting the optical assembly. Consequently, the light color of a pixel having red, green, and blue subpixels is shifted because the brightness of each color is affected by its dispersion angle.

In embodiments of the disclosure, an optical assembly is disposed over a display pixel array and a graphics processing unit is configured to apply a dispersion adjustment profile to the image. The dispersion adjustment profile may be specific to the optical assembly in that the dispersion adjustment profile takes into account the bending angle or focusing properties of the optical assembly in addition to the dispersion angles of the different colors of display light exiting the optical assembly. Each pixel in the display may correspond to an incidence position on the optical assembly and that incidence position on the optical assembly may correspond with a bending angle of the optical assembly. The dispersion adjustment profile may also take into account differing chief ray angles for different positions of different display pixels.

Each red, green, and blue subpixel included in a display pixel may have a slightly different bending angle due to dispersion. The brightness value of subpixels may be adjusted according to a brightness profile of the subpixel at a chief ray angle of display light exiting the optical assembly to an eye of the user of the HMD. The brightness value of the subpixels may be adjusted according to a white color target so that the image, as seen by the eye of the HMD user, is rendered with the intended chromaticity.

Since the dispersion adjustment profile may be specific to the optical assembly, the correction of the subpixel value of each subpixel is dependent on the position of the pixel with respect to the optical assembly. Thus, the dispersion adjustment profile may correct each subpixel value differently depending on the pixel position of the subpixel. As used in this disclosure, the term chief ray angle is the angle that the display light would follow to propagate through a pupil of an eye of the user to become incident on the retina. The correction of each subpixel value may be a reduction of a grey-level value driven onto each subpixel. These and other embodiments are described with respect to FIGS. 1-12 below.

FIG. 1 illustrates an example head mounted display (HMD) 100 that may be configured for digital color dispersion correction, in accordance with an embodiment of the disclosure. Example head mounted display (HMD) 100 includes a top structure 141, a rear securing structure 143, and a side structure 142 attached with a viewing structure 140. The illustrated HMD 100 is configured to be worn on a head of a user of the HMD. In one embodiment, top structure 141 includes a fabric strap that may include elastic. Side structure 142 and rear securing structure 143 may include a fabric as well as rigid structures (e.g. plastics) for securing the HMD to the head of the user. HMD 100 may optionally include earpiece(s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100.

Example HMD 100 also includes a chassis for supporting hardware of the viewing structure 140 of HMD 100. Hardware of viewing structure 140 may include any of processing logic, wired and/or wireless data interface for sending and receiving data, graphic processors, and one or more memories for storing data and computer-executable instructions. In one embodiment, viewing structure 140 may be configured to receive wired power. In one embodiment, viewing structure 140 is configured to be powered by one or more batteries. In one embodiment, viewing structure 140 may be configured to receive wired data including video data. In one embodiment, viewing structure 140 is configured to receive wireless data including video data.

Viewing structure 140 may include a display and corresponding optical assembly for directing display light to a wearer of HMD 100. The display may include a Liquid Crystal Display (LCD) having a two-dimensional display pixel array of liquid crystal pixels arranged in rows and columns, for example. The display may include an organic light emitting diode (OLED) display, micro-LED display, or quantum dot display for directing display light to a wearer of HMD 100.

Figure 2:
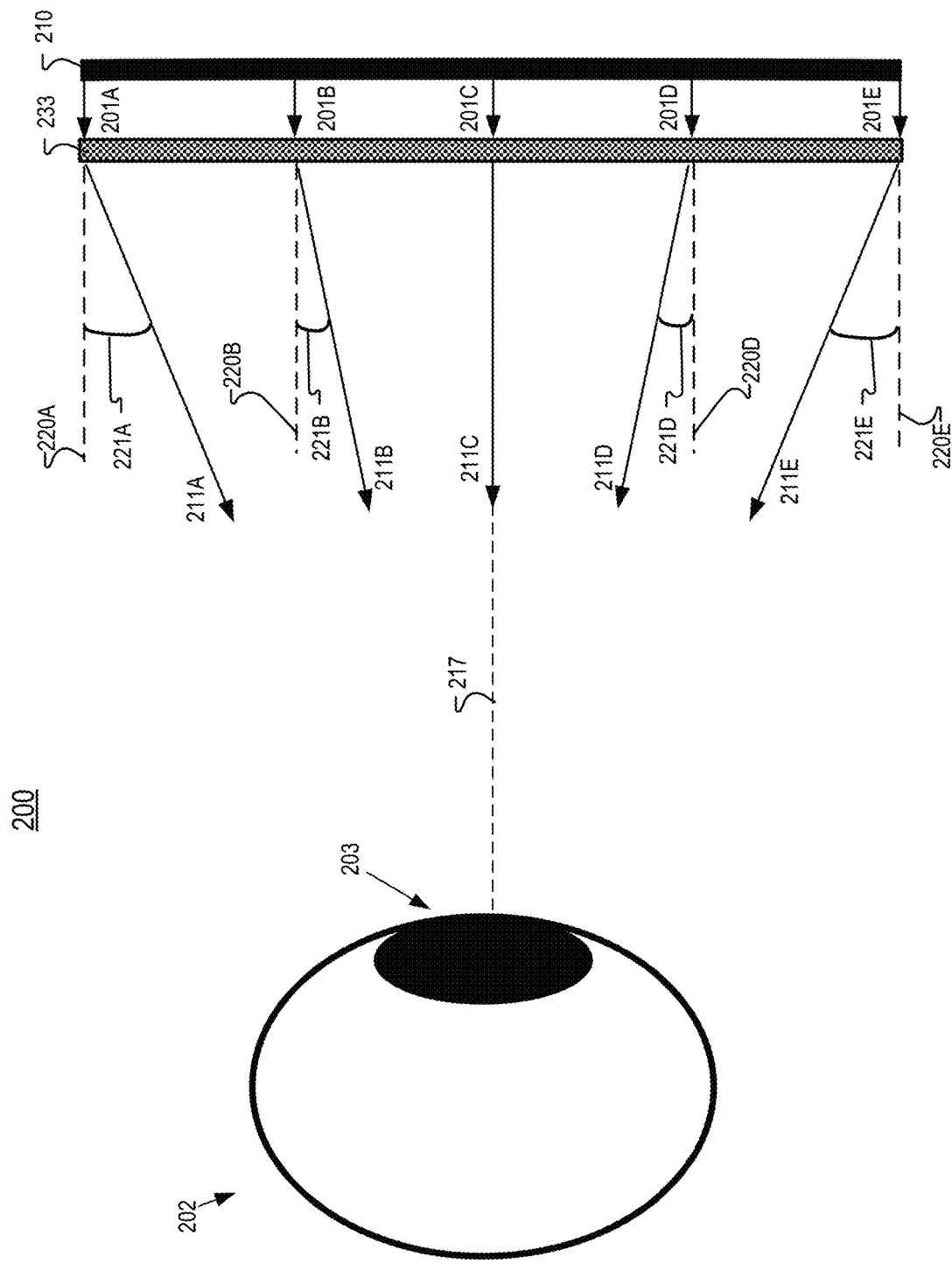
FIG. 2 illustrates a system including a display and an optical assembly, in accordance with an embodiment of the disclosure.

FIG. 2 illustrates a system 200 including a display 210 and an optical assembly 233, in accordance with embodiments of the disclosure. FIG. 2 may be either a side view or a top view of system 200. Display 210 includes a display pixel array configured to generate display light 201 that may include images for presentation to eye 202. Optical assembly 233 may be disposed over display 210 or otherwise coupled to display 210 in some embodiments, although it is offset in FIG. 2 for illustrative purposes. Optical assembly 233 is configured to receive display light 201 and generate compensated display light 211 represented by compensated display light rays 211A, 211B, 211C, 211D, and 211E.

In operation, display 210 emits display light 201 that includes display light rays 201A, 201B, 201C, 201D, and 201E. Display light ray 201C may be emitted from a center of display 210 while display light rays 201A and 201E may be emitted from edges of display 210. Display light ray 201C may be emitted from a center of a two-dimensional display pixel array of display 210 and propagate through a center of optical assembly 233 and along a central optical axis 217 to a middle of pupil 203 of eye 202. The central optical axis 217 may be aligned with a center of the display pixel array and a center of the optical assembly 233 in this embodiment. Optical assembly 233 may include a light bending film, in some embodiments. In some embodiments, optical assembly 233 includes a light bending film paired with a refractive focusing lens. Optical assembly 233 may include a "pancake lens" that includes reflective polarizers and waveplates configured to extend an effective focal length of the optical assembly.

Optical assembly 233 may bend or focus a given ray of the display light 201 based on an incidence position that the given ray of the display light 201 becomes incident upon the optical assembly 233. For example, optical assembly 233 imparts a bending angle 221A to display light ray 201A to generate a compensated display light ray 211A. Imparting a bending angle 221A to ray 201A to generate ray 211A may align ray 211A with a chief ray angle that would allow ray 211A to propagate through the pupil of eye 202 to become incident on the retina. Each of rays 211B, 211C, 211D, and 211E may also be aligned with their respective chief ray angle with respect to where an eye of a user will be positioned to view virtual images. Bending angle 221A is measured with respect to an orthogonal axis 220A that is orthogonal to a two-dimensional display pixel plane the display pixel array of display 210.

In FIG. 2, the bending angles 221 imparted by optical assembly 233 increases as the incidence position of a given ray of display light 201 gets farther from a center of optical assembly 233. Bending angle 221A is greater than bending angle 221B because the incidence position of ray 201A is farther from a center of optical assembly 233 than the incidence position of ray 201B, in the illustrated embodiment. Similarly, bending angle 221E is greater than bending angle 221D because the incidence position of ray 201E is farther from a center of optical assembly 233 than the incidence position of ray 201D. Bending angle 221B is measured with respect to an orthogonal axis 220B of the display pixel that emits ray 201B, bending angle 221D is measured with respect to an orthogonal axis 220D of the display pixel that emits ray 201D, and bending angle 221E is measured with respect to an orthogonal axis 220E of the display pixel that emits ray 201E.

Figure 3:
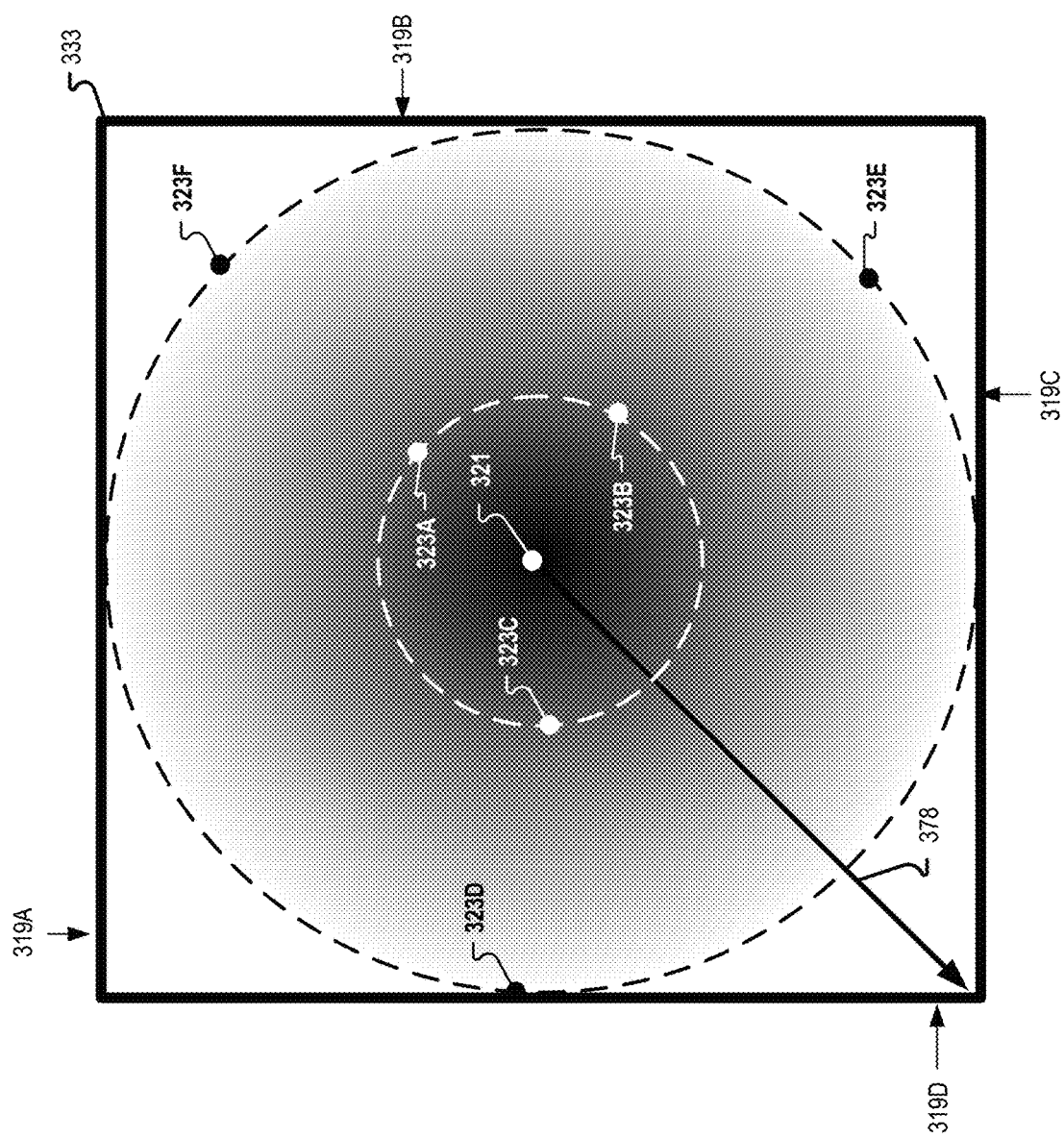
FIG. 3 illustrates a front view of an example optical assembly shaped as a square, in accordance with an embodiment of the disclosure.

FIG. 3 illustrates a front view of an example optical assembly 333 shaped as a square, in accordance with embodiment of the disclosure. In some embodiments, optical assembly 333 may be shaped as a rectangle, a hexagon, or octagon, for example. Optical assembly 333 may be configured to the characteristics of optical assembly 233, in some embodiments. Optical assembly 333 may be placed over a display that has a two-dimensional display pixel array shaped as a square or other shape. Optical assembly 333 may be coupled on a parallel plane to a pixel plane defined by the two-dimensional display pixel array that may be defined by a height of rows of display pixels and a width of columns of display pixels. Optical assembly 333 includes edges 319A, 319B, 319C, and 319D along with a center 321. FIG. 3 shows example incidence positions 323A, 323B, 323C, 323D, 323E, and 323F. Example optical assembly 333 includes a gradient arrow 378 where the farther the incidence position is from the center 321, the greater the bending angle imparted by the optical assembly 333 will be.

The gradient of gradient arrow 378 is also indicated by the darker shading near center 321 becoming progressively lighter as a distance from center 321 increases to represent a bending angle becoming progressively greater as the distance from center 321 increases. Hence, the bending angle imparted to a ray of display light 201 incident at incidence position 323D will be greater than a bending angle imparted to a ray of display light 201 incident at incidence position 323C.

FIG. 3 shows that rays of display light 201 incident at incidence positions 323A, 323B, and 323C are all equal distance from center 321 (along a same radius that defines the illustrated white dashed-line circle). Therefore, the bending angle imparted to a given ray of display light 201 incidence at incidence positions 323A, 323B, and 323C may have a same bending angle. Similarly, rays of display light 201 incident at incidence positions 323D, 323E, and 323F are also equal distance from center 321 and may have a same bending angle. Of course, the bending angle imparted by optical assembly 333 will be greater at incidence position 323D than the bending angle imparted at incidence position 323A. In one embodiment, optical assembly 333 imparts a bending angle 221B to rays of display light 201 incident at incident positions 323A-C and imparts a bending angle 221A to rays of display light 201 incident at incident positions 323D-F. Optical assembly 333 may impart a bending angle of approximately 0 degrees to display light received at the center 321 of optical assembly 333 and impart a bending angle of between 15 and 25 degrees at an edge 319 of the optical assembly 333. Optical assembly 333 may include a light bending film including liquid crystal cells to impart a bending angle to incident display light.

Figure 4:
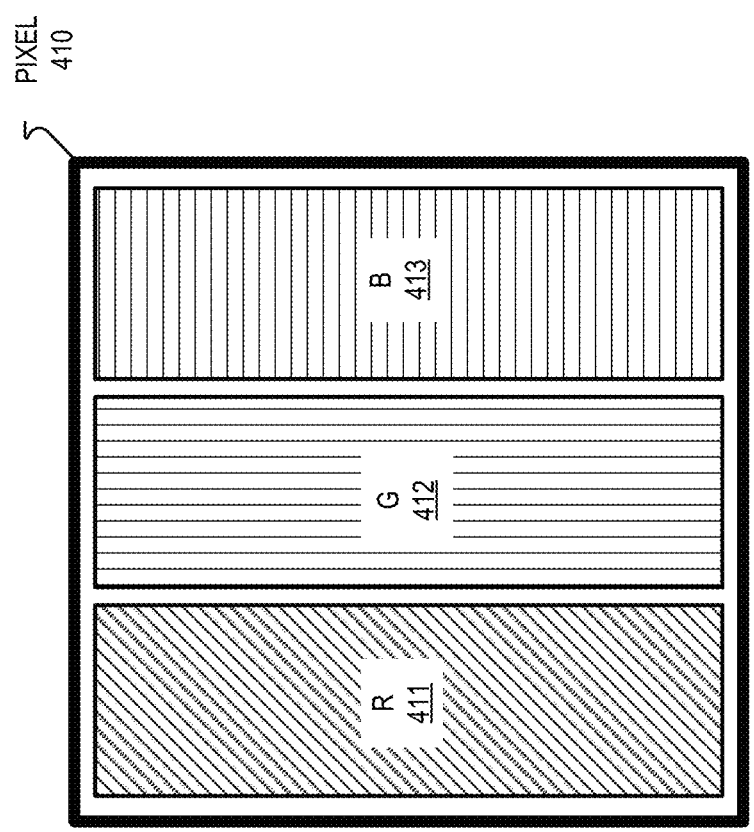
FIG. 4 illustrates an example display pixel that may be included in a display pixel array, in accordance with an embodiment of the disclosure.

FIG. 4 illustrates an example display pixel 410 that may be included in a display pixel array of display 210, in accordance with an embodiment of the disclosure. The illustrated display pixel 410 includes a red subpixel R 411, a green subpixel G 412, and a blue subpixel B 413. When an image is received, display 210 may drive red, green, and blue subpixel values onto subpixels 411, 412, and 413, respectively to generate a chromaticity value for display light emitted from pixel 410. In some embodiments, the subpixel values are referred to as grey-levels and may have a value between 0 and 255 (8 bits). If all of the subpixels 411, 412, and 413 are driven to full brightness (grey-level 255), the red, green, and blue display light emitted by pixel 410 mixes into a white light. The white light may have an xy chromaticity defined by a white color target in CIE 1931 color space. As those skilled in the art appreciate, pixel 410 is one example configuration of a display pixel and that other subpixel arrangements may be used in accordance with embodiments of this disclosure.

Figure 5:
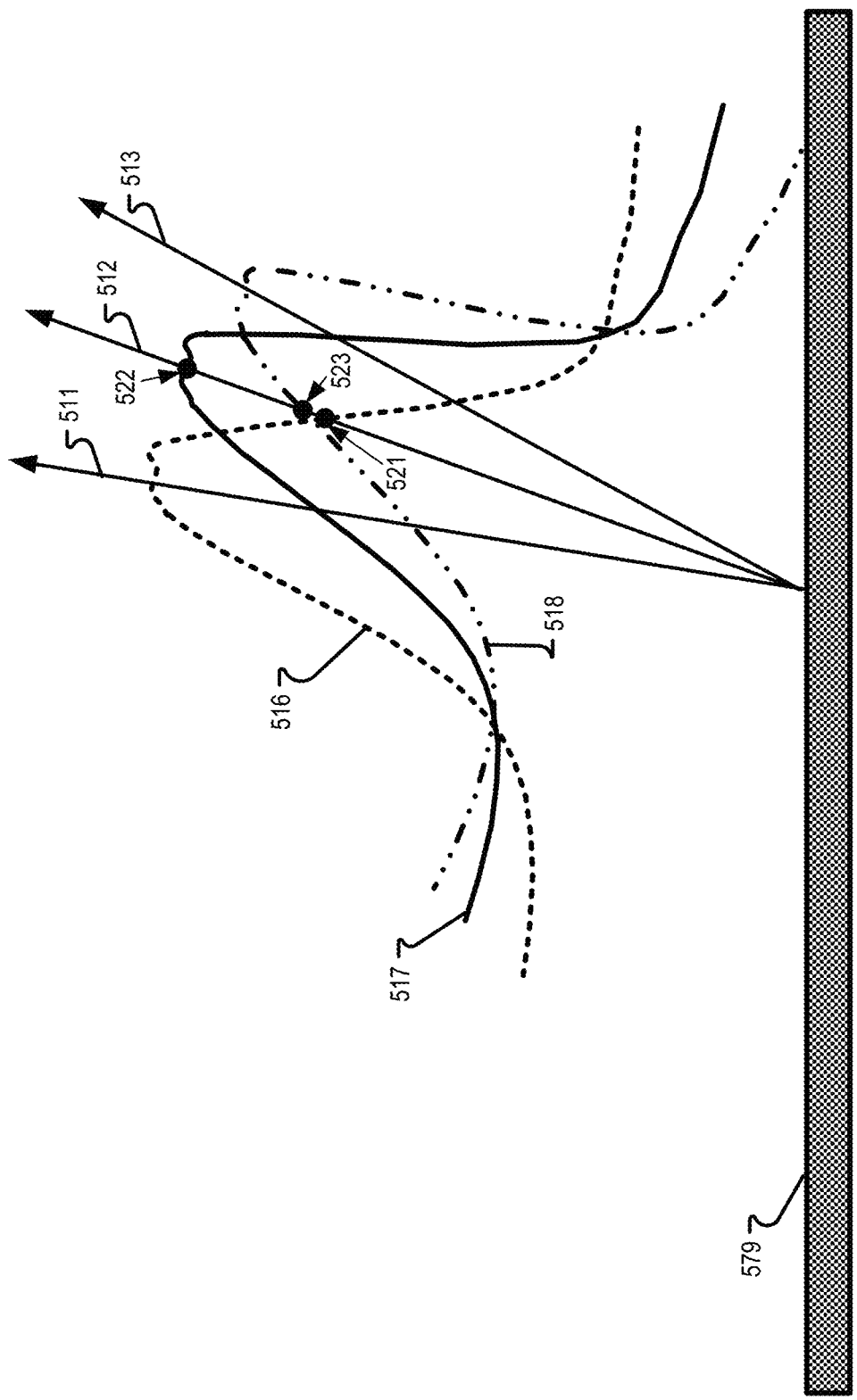
FIG. 5 illustrates an example optical assembly emitting red, green, and blue display light at different angles due to dispersion.

FIG. 5 illustrates an example optical assembly 579 emitting red, green, and blue display light at different angles due to dispersion. Arrows 511, 512, and 513 illustrate a dispersion angle of red, green, and blue display light emitted by red, green, and blue subpixels that are included in a display pixel. Brightness profile 516 (dashed line) represents the brightness of the red display light at different viewing angles, brightness profile 517 (solid line) represents the brightness of the green display light at different viewing angles, and brightness profile 518 (dash-dot-dot line) represents the brightness of the blue display light at different viewing angles. Arrows 511, 512, and 513 go through the peak of each brightness profile 516, 517, and 518, respectively.

Brightness level 522 indicates the peak brightness level of green brightness profile 517 where arrow 512 intersects green brightness profile 517. Brightness level 523 indicates the brightness level of blue brightness profile 518 where arrow 512 intersects blue brightness profile 518. Brightness level 521 indicates the brightness level of red brightness profile 516 where arrow 512 intersects red brightness profile 516.

Figure 6:
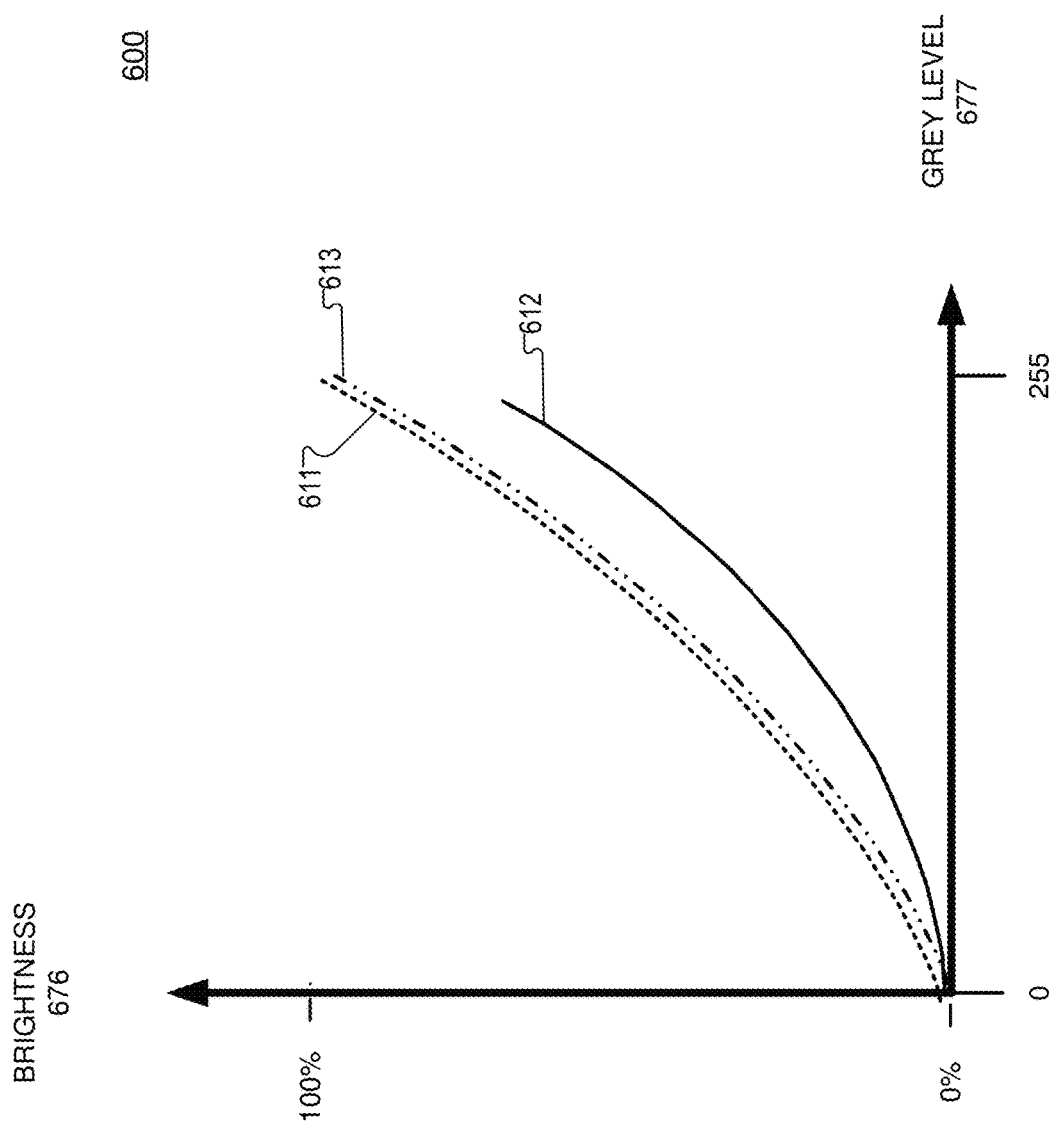
FIG. 6 illustrates an example chart having red, green, and blue gamma curves for digital color dispersion correction.

FIG. 6 illustrates an example chart 600 having red, green, and blue gamma curves for digital color dispersion correction. Chart 600 has a vertical brightness axis 676 and a horizontal grey level axis 677. In FIG. 5, the red brightness level 521 is the lowest brightness level along arrow 512. Therefore, the blue brightness level 523 and green brightness level 522 can be reduced to color-balance the light to correct for the dispersion angles of the different colors of display light. FIG. 6 shows that blue gamma curve 613 has been reduced slightly from red gamma curve 611 and green gamma curve 612 has been reduced significantly to color-correct the display light. Green gamma curve 612 has been reduced significantly because green brightness level 522 is significantly more than red brightness level 521 while blue brightness level 523 is just slightly above green brightness level 522.

Gamma curves 611, 612, and 613 show the brightness level of each subpixel in relationship to a digital grey level value that is assigned to the subpixel. Hence, even when an image has a grey level value of 255 for a green subpixel, the green subpixel will not be driven to 100% (full brightness) since a user viewing the display through optical assembly 579 would see a virtual image dominated by the green light. Instead, the brightness value driven onto the green subpixel follows the green gamma curve 612. Similarly, the brightness value driven onto the blue subpixel follows the blue gamma curve 613.

Figure 7:
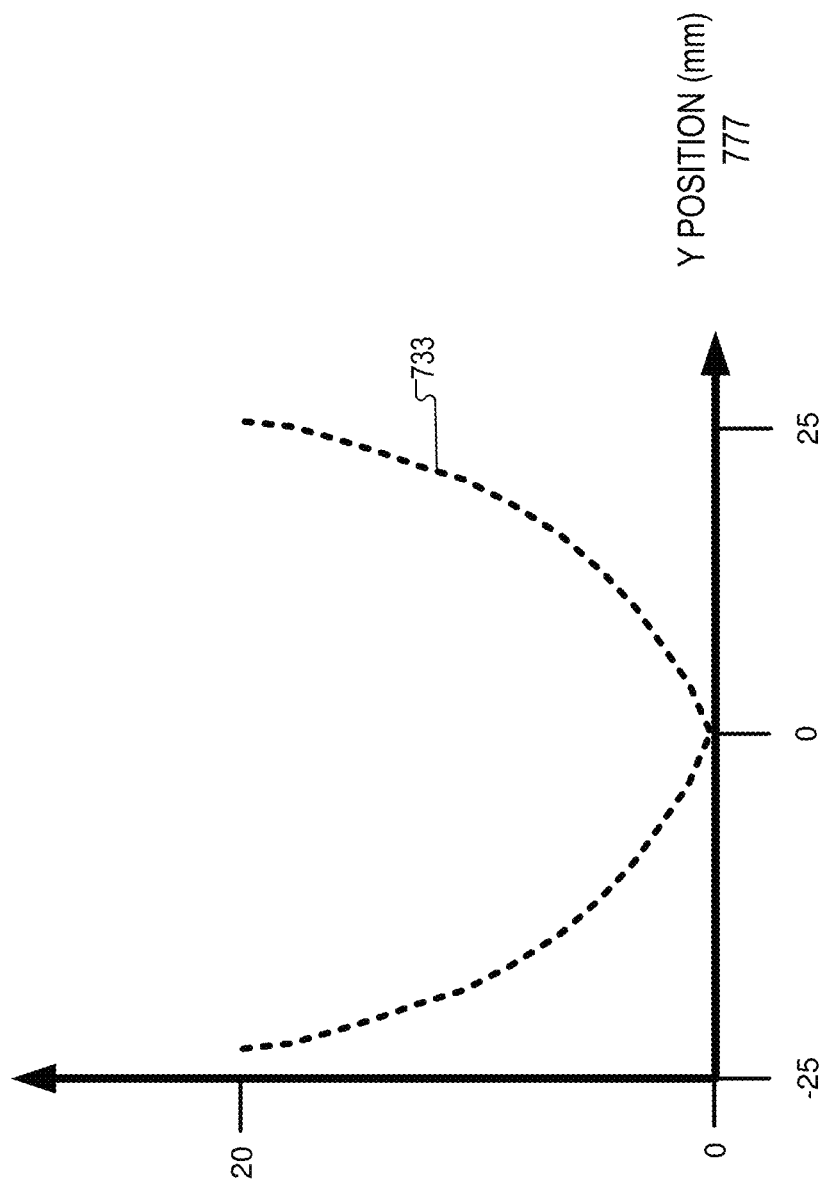
FIG. 7 illustrates an example chart illustrating a chief ray angle of display light with respect to a position of a display pixel, in accordance with an embodiment of the disclosure.

FIG. 7 illustrates an example chart 700 illustrating a chief ray angle of display light with respect to a position of a display pixel, in accordance with an embodiment of the disclosure. Profile 733 shows that for a display pixel at the y position of zero, the chief ray angle for that display pixel is also zero. The y position of zero may correspond to a middle of a display and a middle of the optical assembly. For example, they position of zero may be associated with display light 201C and compensated display light 211C, in FIG. 2. As the position of the display pixel moves farther from the y position of zero, the chief ray angle increases. The y position of −25 mm may correspond with display light 201E and compensated display light 211E, in FIG. 2. The y position of 25 mm may correspond with display light 201A and compensated display light 211A, in FIG. 2. In some embodiments, the chief ray angle of a particular display pixel with respect to an x position of the display pixel may follow a profile similar to profile 733 where the chief ray angle increases as the x position of the display pixel moves farther from an x position of zero (which may correspond with a middle of the display and optical assembly).

Figure 8:
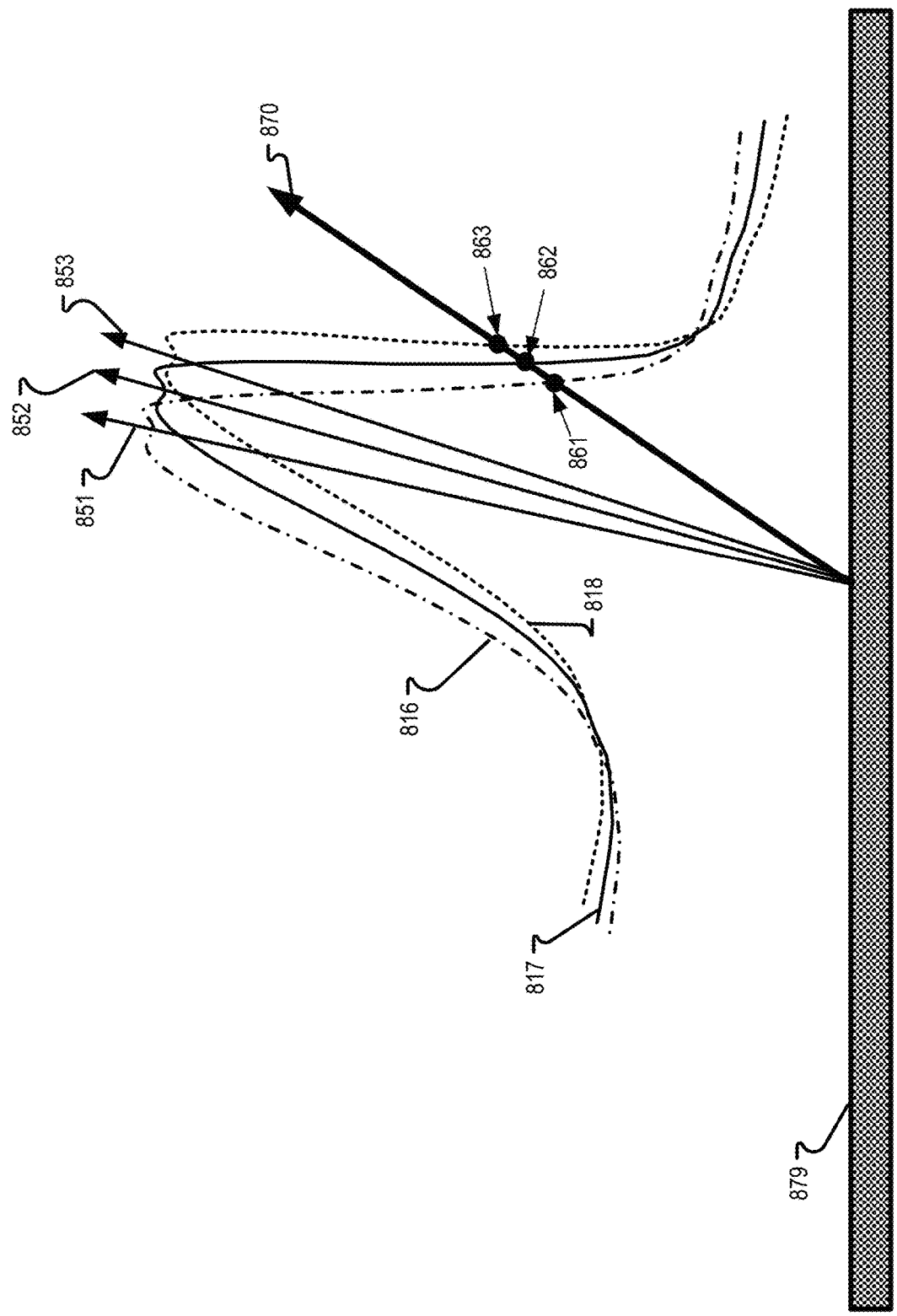
FIG. 8 illustrates an example optical assembly emitting red, green, and blue light that is offset from a chief ray angle, in accordance with an embodiment of the disclosure.

FIG. 8 illustrates an example optical assembly 879 emitting red, green, and blue light that is offset from a chief ray angle, in accordance with an embodiment of the disclosure. Example optical assembly 879 emits red, green, and blue display light at different angles due to dispersion. The red, green, and blue display light may be centered around approximately 650 nm, 550 nm, and 450 nm, respectively. Arrows 851, 852, and 853 illustrate a dispersion angle of blue, green, and red display light emitted by blue, green, and red subpixels that are included in a display pixel. Brightness profile 816 (dash-dot line) represents the brightness of the blue display light at different viewing angles, brightness profile 817 (solid line) represents the brightness of the green display light at different viewing angles, and brightness profile 818 (dashed line) represents the brightness of the red display light at different viewing angles. Arrows 851, 852, and 853 go through the peak of each brightness profile 816, 817, and 818, respectively.

The chief ray angle represented by arrow 870 is associated with a display pixel having a red, green, and blue subpixel emitting the red, green, and blue display light, respectively. The chief ray angle represented by arrow 870 is the optical path that display light will take (after exiting the optical assembly 879) through the pupil of the eye to become incident on the retina. Consequently, to present the proper chromaticity to the eye, two or more of the subpixel values (e.g. grey levels) may be adjusted to correct for both the dispersion angle of the different colors of display light and the offset of the dispersion angles from the chief ray angle.

Brightness level 863 indicates the brightness level of red brightness profile 818 where arrow 870 intersects red brightness profile 818. Brightness level 862 indicates the brightness level of green brightness profile 817 where arrow 870 intersects green brightness profile 817. Brightness level 861 indicates the brightness level of blue brightness profile 816 where arrow 870 intersects blue brightness profile 816. To compensate for the red light dispersion angle (represented by arrow 853) and the chief ray angle (represented by arrow 870), the red subpixel value may be reduced by a first off-axis brightness value that brings red brightness value 863 down to blue brightness value 861. Similarly, to compensate for the green light dispersion angle (represented by arrow 852) and the chief ray angle (represented by arrow 870), the green subpixel value may be reduced by a second off-axis brightness value that brings green brightness value 862 down to blue brightness value 861.

In one embodiment, a bending angle imparted to the red, green, and blue display light by optical assembly 879 is 15.1, 12.7, and 10.4 degrees, respectively. The chief ray angle represented by arrow 870 may be approximately 30 degrees with respect to an axis orthogonal to the surface of the optical assembly 879. Thus arrow 851, 852, and 853 may be offset from arrow 870 by 14.9, 17.3, and 19.6, respectively. The off-axis brightness of the red, green, and blue subpixel may be 52%, 44%, and 35% of peak brightness, respectively. Therefore, the off-axis brightness of the red subpixel may be adjusted by a first off-axis brightness value that is greater than the second off-axis brightness value so that the red and green subpixel value for the display pixel are adjusted down to the 35% brightness of the blue brightness level 861.

Of course, FIG. 8 illustrates a particular example associated with a particular display pixel position and associated chief ray angle. However, each display pixel in a display pixel array will have a different position and so the dispersion angles and chief ray angles associated with different display pixels may be different for each display pixel. Accordingly, the first off-axis brightness value and the second off-axis brightness value may be different for each display pixel. The first off-axis brightness value and the second off-axis brightness value for each display pixel may be stored in a dispersion adjustment profile that can be applied to a received image that will be rendered onto the display pixel array to achieve digital color dispersion correction for the entire image to correct for a particular optical assembly coupled with the display of the HMD.

Figure 9:
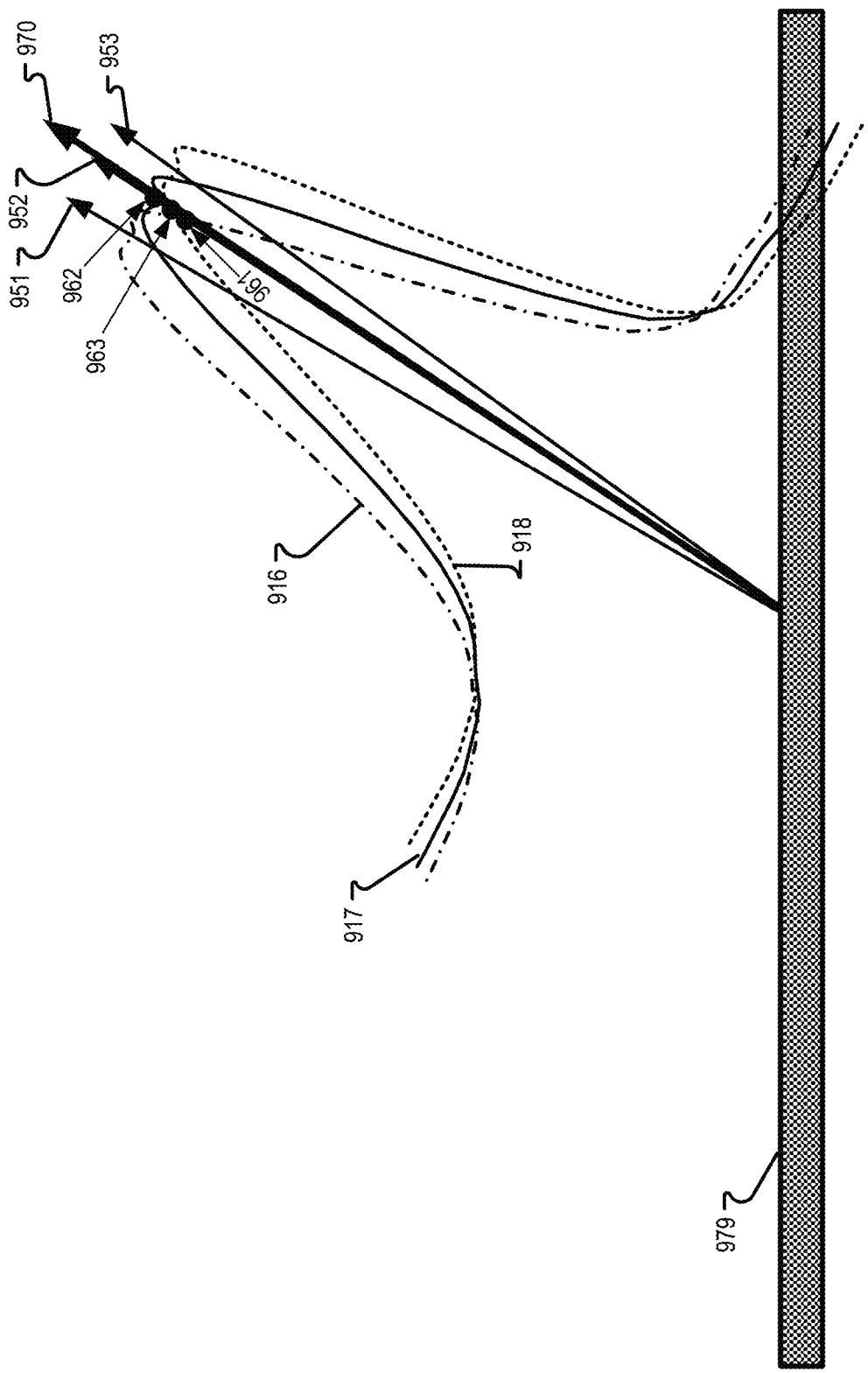
FIG. 9 illustrates an example optical assembly emitting red, green, and blue light where the chief ray angle is between the red dispersion angle and the blue dispersion angle, in accordance with an embodiment of the disclosure.

FIG. 9 illustrates an example optical assembly 979 emitting red, green, and blue light where the chief ray angle is between the red dispersion angle and the blue dispersion angle, in accordance with an embodiment of the disclosure. Example optical assembly 979 emits red, green, and blue display light at different angles due to dispersion. Arrows 951, 952, and 953 illustrate a dispersion angle of blue, green, and red display light emitted by blue, green, and red sub-pixels that are included in a display pixel. Brightness profile 916 (dash-dot line) represents the brightness of the blue display light at different viewing angles, brightness profile 917 (solid line) represents the brightness of the green display light at different viewing angles, and brightness profile 918 (dashed line) represents the brightness of the red display light at different viewing angles. Arrows 951, 952, and 953 go through the peak of each brightness profile 916, 917, and 918, respectively.

The chief ray angle represented by arrow 970 is associated with a display pixel having a red, green, and blue subpixel emitting the red, green, and blue display light, respectively. The chief ray angle represented by arrow 970 is the optical path that display light will take (after exiting the optical assembly 979) through the pupil of the eye to become incident on the retina. Consequently, to present the proper chromaticity to the eye, two or more of the subpixel values (e.g. grey levels) may be adjusted to correct for both the dispersion angle of the different colors of display light and the offset of the dispersion angles from the chief ray angle.

In FIG. 9, brightness level 962 indicates the brightness level of green brightness profile 917 where arrow 970 intersects green brightness profile 917. Brightness level 963 indicates the brightness level of red brightness profile 918 where arrow 970 intersects red brightness profile 918. Brightness level 961 indicates the brightness level of blue brightness profile 916 where arrow 970 intersects blue brightness profile 916. To compensate for the red light dispersion angle (represented by arrow 953) and the chief ray angle (represented by arrow 970), the red subpixel value may be reduced by a first off-axis brightness value that brings red brightness value 963 down to blue brightness value 961. Similarly, to compensate for the green light dispersion angle (represented by arrow 952) and the chief ray angle (represented by arrow 970), the green subpixel value may be reduced by a second off-axis brightness value that brings green brightness value 962 down to blue brightness value 961. In the context illustrated in FIG. 9, the red brightness value 963 is closer to the blue brightness value 961 than the green brightness value 962. Accordingly, the reduction of the red brightness value 963 (by the first off-axis brightness factor) is less than the reduction of the green brightness value 962 (by the second off-axis brightness factor).

Figure 10:
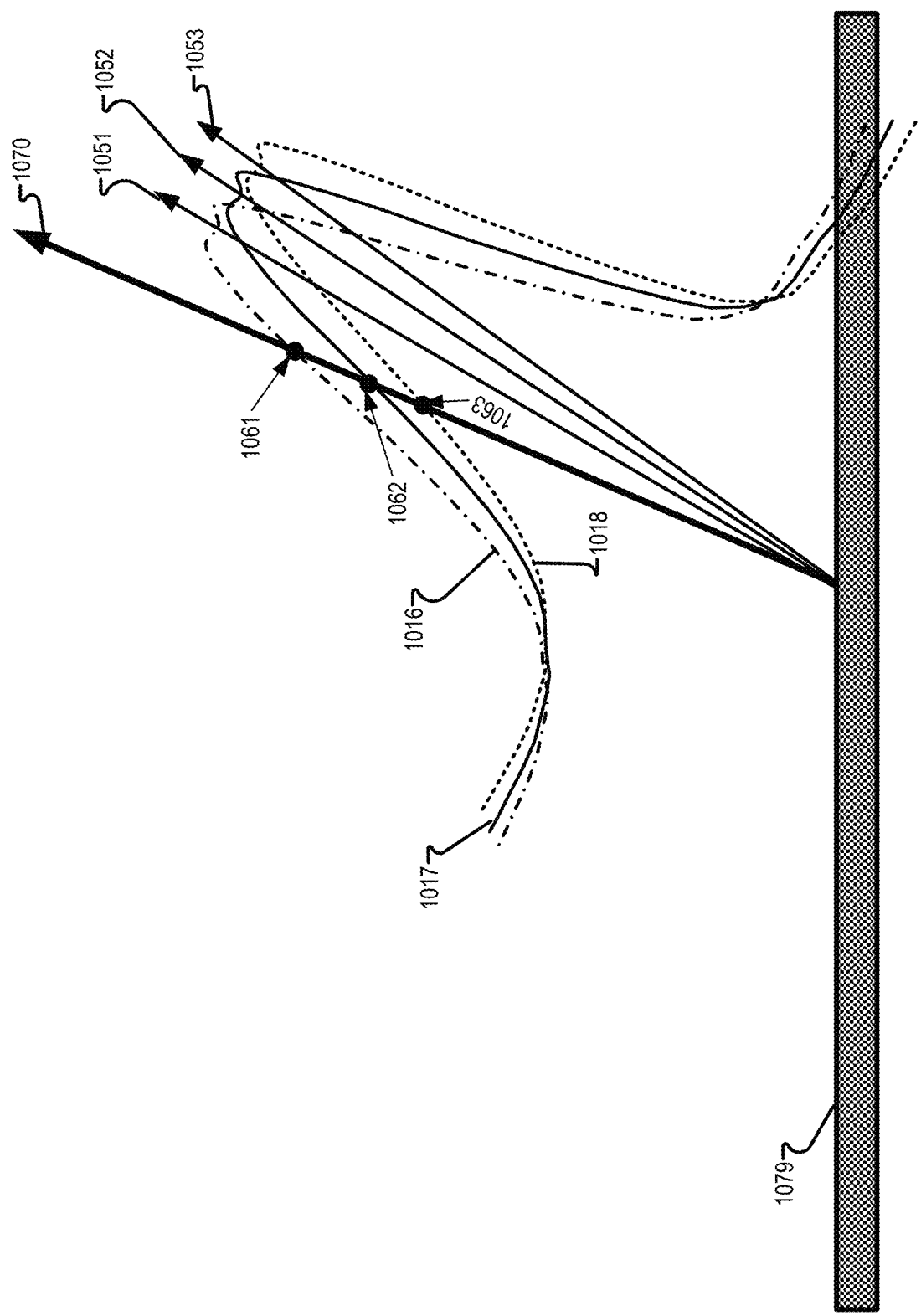
FIG. 10 illustrates an example optical assembly emitting red, green, and blue light that is offset from a chief ray angle, in accordance with an embodiment of the disclosure.

FIG. 10 illustrates an example optical assembly 1079 emitting red, green, and blue light that is offset from a chief ray angle, in accordance with an embodiment of the disclosure. Example optical assembly 1079 emits red, green, and blue display light at different angles due to dispersion. Arrows 1051, 1052, and 1053 illustrate a dispersion angle of blue, green, and red display light emitted by blue, green, and red subpixels that are included in a display pixel. The dispersion angles of the red, green, and blue light are greater than the chief ray angle, in FIG. 10. Brightness profile 1016 (dash-dot line) represents the brightness of the blue display light at different viewing angles, brightness profile 1017 (solid line) represents the brightness of the green display light at different viewing angles, and brightness profile 1018 (dashed line) represents the brightness of the red display light at different viewing angles. Arrows 1051, 1052, and 1053 go through the peak of each brightness profile 1016, 1017, and 1018, respectively.

The chief ray angle represented by arrow 1070 is associated with a display pixel having a red, green, and blue subpixel emitting the red, green, and blue display light, respectively. The chief ray angle represented by arrow 1070 is the optical path that display light will take (after exiting the optical assembly 1079) through the pupil of the eye to become incident on the retina. Consequently, to present the proper chromaticity to the eye, two or more of the subpixel values (e.g. grey levels) may be adjusted to correct for both the dispersion angle of the different colors of display light and the offset of the dispersion angles from the chief ray angle.

In FIG. 10, brightness level 1062 indicates the brightness level of green brightness profile 1017 where arrow 1070 intersects green brightness profile 1017. Brightness level 1063 indicates the brightness level of red brightness profile 1018 where arrow 1070 intersects red brightness profile 1018. Brightness level 1061 indicates the brightness level of blue brightness profile 1016 where arrow 1070 intersects blue brightness profile 1016. To compensate for the blue light dispersion angle (represented by arrow 1051) and the chief ray angle (represented by arrow 1070), the blue subpixel value may be reduced by a first off-axis brightness value that brings blue brightness value 1061 down to red brightness value 1063. Similarly, to compensate for the green light dispersion angle (represented by arrow 1052) and the chief ray angle (represented by arrow 1070), the green subpixel value may be reduced by a second off-axis brightness value that brings green brightness value 1062 down to red brightness value 1063. In the context illustrated in FIG. 10, the blue brightness value 1061 is farther from red brightness value 1063 than the green brightness value 1062. Accordingly, the reduction of the blue brightness value 1061 (by the first off-axis brightness factor) is greater than the reduction of the green brightness value 1062 (by the second off-axis brightness factor).

Figure 11:
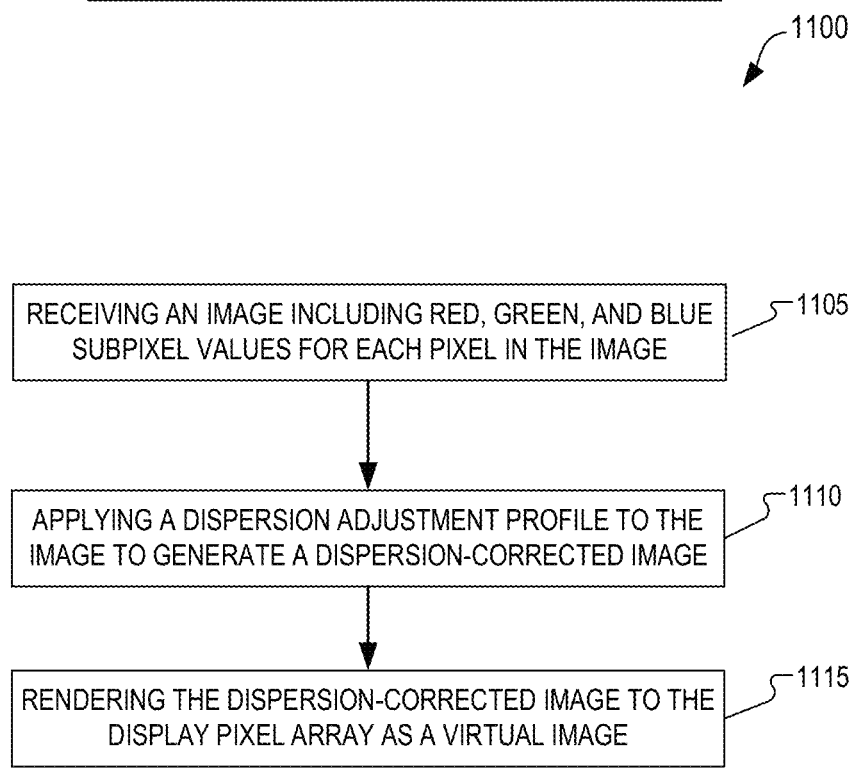
FIG. 11 illustrates a flow chart of an example process of digital color dispersion correction, in accordance with an embodiment of the disclosure.

FIG. 11 illustrates a flow chart of an example process 1100 of digital color dispersion correction, in accordance with an embodiment of the disclosure. The order in which some or all of the process blocks appear in process 1100 should not be deemed limiting. Rather, one of ordinary skill in the art having the benefit of the present disclosure will understand that some of the process blocks may be executed in a variety of orders not illustrated, or even in parallel.

In process block 1105, an image is received that includes red, green, and blue subpixel values for each pixel in the image.

Figure 12:
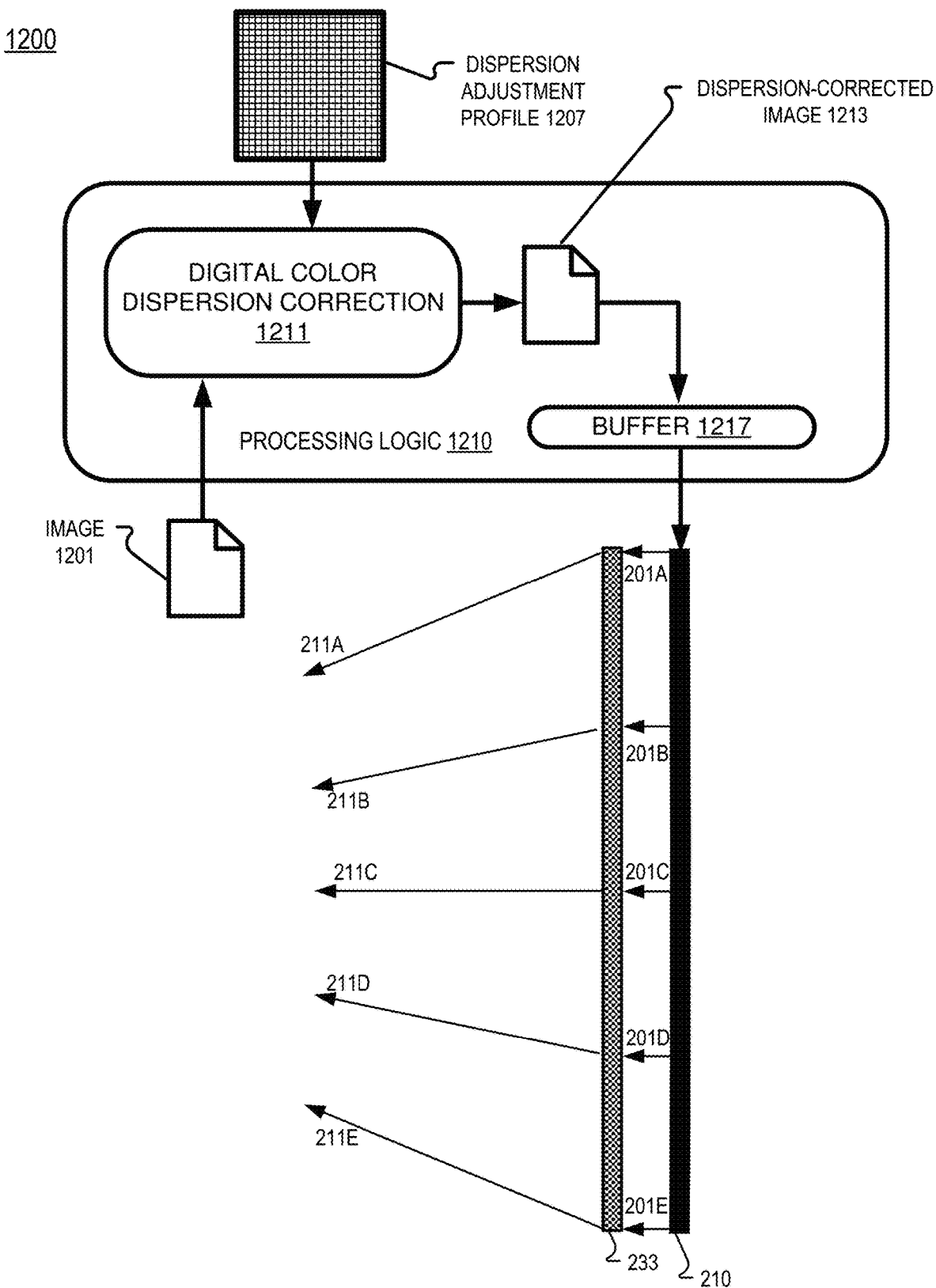
FIG. 12 illustrates a block diagram system including a digital color dispersion correction engine that generates a distortion-corrected image, in accordance with an embodiment of the disclosure.

FIG. 12 illustrates an example block diagram system 1200 that includes processing logic 1210 that may execute operations of process 1100, in accordance with an embodiment of the disclosure. Processing logic 1210 may be a graphics processing unit (GPU), in some embodiments. In FIG. 12, digital color dispersion correction engine 1211 receives image 1201. Image 1201 may be a natural image of a landscape or an image for a game, for example.

In process block 1110 of FIG. 11, a dispersion adjustment profile is applied to the image to generate a dispersion-corrected image. The dispersion adjustment profile is specific to a particular optical assembly that is disposed over a display pixel array of an HMD. The dispersion adjustment profile adjusts at least two of the red, green, or blue subpixel values of the image according to a white color target to compensate for dispersion angles of red, green, and blue display light propagating through the optical assembly. In some embodiments, the dispersion adjustment profile also corrects for an offset between a chief ray angle of a particular display pixel.

In the example system of FIG. 12, digital color dispersion correction engine 1211 receives image 1201. Digital color dispersion correction engine 1211 also receives dispersion adjustment profile 1207 and applies dispersion adjustment profile 1207 to image 1201 to generate dispersion-corrected image 1213.

In process block 1115, the dispersion-corrected image is rendered to a display pixel array that is paired with an optical assembly that focuses the dispersion-corrected image as a virtual image for a user of an HMD.

System 1200 of FIG. 12 may be included in an HMD, such as HMD 100. Dispersion-corrected image 1213 is provided to buffer 1217 for rendering to display pixel array 210. Optical assembly 233 is disposed over display pixel array 210 to focus display light from the display pixel array to an eye in an eyebox area. In some embodiments, additional image rendering operations (not illustrated) may be performed on image 1201 by processing logic 1210. Color aberration and distortion correction operations may also be performed on image 1201 or image 1213 by processing logic 1210.

Dispersion adjustment profile 1207 may have a unique first off-axis brightness factor and second off-axis brightness factor for each individual pixel of the display pixel array 210 because each display pixel has a different position corresponding to a different chief ray angle. Therefore, dispersion adjustment profile 1207 may include a two dimensional table having as many units as there are display pixels in display pixel array 210 and each unit in the table may include a first off-axis brightness factor and second off-axis brightness factor unique to a particular display pixel. The first off-axis brightness factor and second off-axis brightness factor for each unit may be calculated or measured in a calibration test, for example. Dispersion adjustment profile 1207 is matched to optical assembly 233 to account for the optics in optical assembly 233 and the corresponding dispersion angles for each incidence position of display light incident upon different positions in optical assembly 233. Dispersion adjustment profile 1207 may also be matched to display pixel array 210 since the exact wavelengths of the red, green, and blue display light emitted by the display will determine the dispersion angles of the red, green, and blue display light.

In one embodiment of process 1100, the dispersion adjustment profile also adjusts at least two of the red, green, or blue subpixel values according to a chief ray angle associated with a particular display pixel that will drive the red, green, and blue subpixel values onto its red, green, and blue subpixels. The chief ray angle for the particular display pixel allows the display light from a position of the particular display pixel to propagate through the pupil of an eye of a user of the HMD.

In one embodiment of process 1100, the dispersion adjustment profile corrects at least two of the red, green, or blue subpixel values for each pixel position in the display pixel array to compensate for varying dispersion angles of red, green, and blue display light propagating through incidence positions of the optical assembly associated with the pixel positions. The first off-axis brightness factor and the second off-axis brightness factor depend on a position of a given display pixel relative to the optical assembly.

In one embodiment of process 1100 corresponding to FIG. 8, applying the dispersion adjustment profile reduces the red subpixel value for each pixel by a first off-axis brightness factor and reduces a green subpixel value for each pixel by a second off-axis brightness factor. In this context, the reduction of the red subpixel value may be greater than the reduction of the green subpixel value. The blue subpixel value may not necessarily be adjusted by the dispersion adjustment profile.

In one embodiment of process 1100 corresponding to FIG. 9, applying the dispersion adjustment profile reduces the red subpixel value for each pixel by a first off-axis brightness factor and reduces a green subpixel value for each pixel by a second off-axis brightness factor. In this context, the reduction of the red subpixel value may be less than the reduction of the green subpixel value. The blue subpixel value may not necessarily be adjusted by the dispersion adjustment profile.

In one embodiment of process 1100 corresponding to FIG. 10, applying the dispersion adjustment profile reduces the blue subpixel value for each pixel by a first off-axis brightness factor and reduces a green subpixel value for each pixel by a second off-axis brightness factor. The reduction of the blue subpixel value may be greater than the reduction of the green subpixel value. The red subpixel value of the same pixel may not necessarily be adjusted by the dispersion adjustment profile.

For the contexts of FIGS. 8, 9, and 10, the first off-axis brightness factor and the second off-axis brightness factor may depend on a position of a given display pixel relative to the optical assembly.

Since the chief ray angle for a given display pixel may increase as the position of the display pixel gets closer to the outside of the display pixel array, the dispersion adjustment profile may increase the adjustments (e.g. reducing the subpixel values with the first and second off-axis brightness factor) of the red, green, or blue subpixel values as a given pixel of the image gets closer to an outside of the image.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 1210) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A Head Mounted Display (HMD) comprising:
    a display pixel array of display pixels having red, green, and blue subpixels;
    an optical assembly disposed over the display pixel array to focus display light from the display pixel array to an eyebox;
    a graphics processing unit configured to drive display images onto the display pixel array, wherein the graphics processing units is further configured to:
        receive an image, wherein the image includes red, green, and blue subpixel values for each pixel in the image;

apply a dispersion adjustment profile of the optical assembly to the image to generate a dispersion-corrected image, wherein the dispersion adjustment profile adjusts at least two of the red, green, or blue subpixel values for each pixel position in the display pixel array to compensate for varying dispersion angles of red, green, and blue display light propagating through incidence positions of the optical assembly associated with the pixel positions; and render the dispersion-corrected image to the display pixel array.

2. The HMD of claim 1, wherein the dispersion adjustment profile also adjusts at least two of the red, green, or blue subpixel values according to a chief ray angle associated with a particular display pixel that will drive the red, green, and blue subpixel values onto its red, green, and blue subpixels, the chief ray angle for the particular display pixel allowing the display light from a position of the particular display pixel to propagate through a pupil of an eye of a user of the HMD.

3. The HMD of claim 1, wherein applying the dispersion adjustment profile reduces the red subpixel value for each pixel by a first off-axis brightness factor and reduces a green subpixel value for each pixel by a second off-axis brightness factor, the reduction of the red subpixel value being greater than the reduction of the green subpixel value.

4. The HMD of claim 3, wherein the first off-axis brightness factor and the second off-axis brightness factor depends on a position of a given display pixel relative to the optical assembly.

5. The HMD of claim 1, wherein applying the dispersion adjustment profile reduces the red subpixel value for each pixel by a first off-axis brightness factor and reduces a green subpixel value for each pixel by a second off-axis brightness factor, the reduction of the red subpixel value being less than the reduction of the green subpixel value.

6. The HMD of claim 1, wherein applying the dispersion adjustment profile reduces the blue subpixel value for each pixel by a first off-axis brightness factor and reduces a green subpixel value for each pixel by a second off-axis brightness factor, the reduction of the blue subpixel value being greater than the reduction of the green subpixel value, and further wherein the red subpixel value is not adjusted by the dispersion adjustment profile.

7. The HMD of claim 1, wherein the dispersion adjustment profile increases the adjusting of the red, green, or blue subpixel values as a given pixel gets closer to an outside of the image.

8. The HMD of claim 1, wherein generating the dispersion-corrected image also includes executing color aberration and distortion correction to the image.

9. The HMD of claim 1, wherein the optical assembly is configured to impart a bending angle to a given ray of the display light based on an incidence position that the given ray of the display light becomes incident upon the optical assembly, and wherein the bending imparted increases as the incidence position of the optical assembly gets closer to an outside boundary of the optical assembly, wherein the dispersion adjustment profile increases a grey level reduction of at least one of the red, green, or blue subpixel values as the bending angle increases.

10. The HMD of claim 1, wherein the optical assembly includes a light bending film.

11. The HMD of claim 1, wherein a central optical axis of the optical assembly is aligned with a center of the display pixel array.

12. A computer-implemented method of rendering a dispersion-corrected image, the computer-implemented method comprising:

receiving an image, wherein the image includes red, green, and blue subpixel values for each pixel in the image;

applying a dispersion adjustment profile to the image to generate the dispersion-corrected image, wherein the dispersion adjustment profile is specific to an optical assembly disposed over a display pixel array, and wherein the dispersion adjustment profile adjusts at least two of the red, green, or blue subpixel values for pixel positions in the display pixel array to compensate for varying dispersion angles of red, green, and blue display light propagating through incidence positions of the optical assembly associated with the pixel positions; and rendering the dispersion-corrected image to the display pixel array, wherein the optical assembly focuses the dispersion-corrected image as a virtual image.

13. The computer-implemented method of claim 12, wherein applying the dispersion adjustment profile reduces the red subpixel value for each pixel by a first off-axis brightness factor and reduces a green subpixel value for each pixel by a second off-axis brightness factor, the reduction of the red subpixel value being greater than the reduction of the green subpixel value.

14. The computer-implemented method of claim 13, wherein the first off-axis brightness factor depends on a position of a given display pixel relative to the optical assembly.

15. The computer-implemented method of claim 12, wherein applying the dispersion adjustment profile increases the blue subpixel value for each pixel by a first off-axis brightness factor and reduces a red subpixel value for each pixel by a second off-axis brightness factor.

16. The computer-implemented method of claim 12, wherein applying the dispersion adjustment profile reduces the blue subpixel value for each pixel by a first off-axis brightness factor and reduces a green subpixel value for each pixel by a second off-axis brightness factor, the reduction of the blue subpixel value being greater than the reduction of the green subpixel value.

17. The computer-implemented method of claim 12, wherein the dispersion adjustment profile increases the adjusting of the red, green, and blue subpixel values as a given pixel gets closer to an outside of the image.

18. The computer-implemented method of claim 12, wherein the display pixel array is a liquid crystal display pixel array, an organic light emitting diode (OLED) display pixel array, or a micro-LED display pixel array.

19. The computer-implemented method of claim 12, wherein the optical assembly is configured to impart a bending angle to a given ray of the display light based on an incidence position that the given ray of the display light becomes incident upon the optical assembly.

* * * * *